Patented Feb. 13, 1940

2,190,377

UNITED STATES PATENT OFFICE 2,190,377

PROCESS FOR THE PRODUCTION OF KETO GULONIC ACID FROM SORBOSE

Otto Dalmer and Kurt Heyns, Darmstadt, Germany, assignors to Merck & Co. Inc., Rahway, N. J., a corporation of New Jersey No Drawing. Application July 15, 1937, Serial No. 153,760. In Germany July 18, 1936

8 Claims. (Cl. 260—528)

This invention relates to processes for the production of 2-keto-1-gulonic acid from sorbose.

The direct oxidation of 1-sorbose to 2-keto-1-gulonic acid was formerly carried out by treating 1-sorbose in acid solution with oxidizing agents, e. g., nitric acid, hydrogen peroxide and ferrous sulfate, or potassium persulfate. These processes were attended with such poor yields that they lacked commercial utility.

The need has therefore existed of a simple method of preparing 2-keto-1-gulonic acid, such as a direct oxidation of 1-sorbose.

According to the present invention, the reaction referred to can be carried out by a new method producing a yield which is a multiple of those attained by the known methods. It has been found that fifty per cent and more of the theoretical yield of 2-keto-1-gulonic acid can be produced from 1-sorbose by reacting a neutral or slightly alkaline solution of 1-sorbose with oxygen or oxygen-containing gases in the presence of an oxygen-activating noble metal catalyst.

The reaction may be carried out at normal or elevated temperatures and at normal or elevated pressures, in shaking apparatus adapted for reactions of this character, or by leading oxygen in finely divided form into the solution. Platinum or palladium can be used as catalyst. Particularly good results are obtained by using platinized carbon.

It is important to carry out the reaction in neutral or slightly alkaline solution contrary to the teachings of the old methods which employed acid solutions. It has been found that acid solutions remain unchanged. Under strongly alkaline conditions an undesirable decomposition of 1-sorbose occurs which unfavorably affects the ultimate yield of 2-keto-1-gulonic acid. The products of decomposition neutralize the excess alkali by combining therewith (two mols of alkali decomposing one mol of 1-sorbose with simultaneous absorption of one mol of oxygen), so that after a shorter or longer time, depending on the quantity of excess alkali, favorable conditions are again established; but the proportion of sorbose used in this neutralization is lost so that in order to attain good yields it is necessary to work with a reaction mixture having a hydrogen ion concentration corresponding to pH less than 11, and preferably ranging between 8 and 10.

An especially advantageous embodiment of the invention comprises adding to the reaction solution the alkali salt of a weak (inorganic or organic) acid, e. g. in proportion of 1 to 3 mols per mol of sorbose, or a corresponding quantity of a suitable buffer mixture having a pH between 6 and 11.

It is to be observed that during the reaction, according to this invention, an acid is developed from the neutral sorbose which influences the pH in the acid direction. It is, therefore, advantageous to add alkaline reacting solutions or buffer mixtures during the reaction, intermittently or continuously, to neutralize the acid formed.

In addition to the desired reaction, i. e. oxidation of 1-sorbose to 2-keto-1-gulonic acid, undesired side reactions, e. g., formation of 1-threonic acid can also occur. Therefore, the optimum conditions have to be established by a series of tests in which the time of reaction, concentration of the different reaction materials and quantity of salts added are varied. Under the best conditions so found, a portion of the sorbose employed remains unchanged. This portion is advantageously separated out of the reaction products and used again.

The isolation of the 2-keto-1-gulonic acid from the solution freed from catalyst can be effected either directly or in the form of appropriate derivatives (methyl ester, diacetone compound, quinine, sodium, and other salts). However, the reaction mixture thus obtained can also be directly utilized as such for the production of ascorbic acid, or after concentration or partial separation of by-products or added materials, and after recovery of unchanged starting materials.

Examples (1) 18 g. of sorbose are dissolved in 900 cc. of water and, after the addition of 24 g. of dibasic sodium phosphate and 10 g. of platinized carbon containing 10 per cent of platinum deposited thereon, shaken with oxygen. The oxygen may be introduced into the solution under stirring through a sieve plate or through a pipe system containing numerous small holes. 2.5 to 3.0 liters of oxygen are absorbed in 60 hours. Analysis shows that about 30 per cent of sorbose remains unchanged. The catalyst is separated by filtration and the major portion of the unchanged sorbose as well as sodium phosphate separated by crystallization, after evaporation at reduced pressure and addition of 20 cc. of methanol. Accounting for the recovered sorbose, the yield of crude keto gulonic acid is about 50%, based on the amount of reacted sorbose.

After slightly acidifying, the solution is further evaporated to dryness and the residue extracted with dioxane. The combined extracts yield on evaporation at reduced pressure a nearly colorless syrup from which the 2-keto-1-gulonic acid $(F=169\text{-}170°, [\alpha]_D^{22}=-48°$ in water, $c=1)$ can be isolated directly or after treatment with acetone, or can be obtained in pure form as salts (quinine salt $F=154°$ C., or sodium salt) by fractional crystallization.

(2) 18 g. of sorbose are dissolved in 900 cc. of water, 28 g. of sodium acetate U. S. P. XI and 10 g. of 10% platinized carbon are added, and the solution is then shaken with oxygen. The oxygen absorption is about 2.2 liters in about 40 hours. Analysis shows that 40% sorbose remains unchanged. Most of this can be removed by evaporation at reduced pressure, treatment with a small amount of methanol and crystallization. The yield of ketogulonic acid in the mother liquor is 65 to 70 per cent of the theory, taking the recovered sorbose into consideration.

The reaction product is isolated and worked up in the same manner as indicated in Example 1. Since the sodium acetate present is a hindrance to the isolation of free ketogulonic acid, the desired reaction product can be advantageously separated by treatment of the syrup with acetone-hydrochloric acid in known manner as the acetone compound. By using the 10-fold quantity of sodium acetate prescribed above and proceeding otherwise under the same conditions, the oxygen consumption is greatly lowered.

(3) 18 g. of sorbose are dissolved in 900 cc. of water and shaken with oxygen after the addition of 10 g. of 10% platinized carbon. The oxygen absorption amounts to 1.19 liters in 65 hours. 60% of the sorbose remains unchanged. The batch is worked up as in Example 1. The yield of ketogulonic acid amounts to 25% of the theoretical.

(4) 18 g. of sorbose are dissolved in water with 20 g. of potassium oxalate and 15 g. of sodium bicarbonate and mixed with 10 g. of 10% platinized carbon. The solution is then diluted with water to a total volume of 0.9 liter. After shaking the solution with oxygen for 60-70 hours, about 2.3 liters of $O_2$ have been taken up. In this manner about 45% of ketogulonic acid are obtained and about 15% of sorbose are recovered. Further shaking reduces the yield. However, the reaction period can be shortened by raising the temperature to about 60-70°. The batch is worked up as in Example 1 or 6.

(5) 36 g. of sorbose are dissolved in 1780 cc. of water, containing 20 cc. of normal KOH, 10 g. of 10% platinized carbon are added and the solution is shaken with oxygen at room temperature. The oxygen absorption is 1.2 liters in 21 hours. 61% of sorbose remain unchanged of which 55% can be recovered after filtration of the catalyst in the manner set forth in Example 1. The mother liquor contains 35-40% of the theoretical yield of ketogulonic acid, calculated on the sorbose consumed. The same yield is obtained if, instead of shaking with oxygen, the gas is bubbled into the solution through a glass filter plate with simultaneous stirring. After addition of the calculated quantity of normal HCl (20 cc.), the solution is evaporated to dryness under reduced pressure. On taking up the residue in a suitable solvent, e. g., dioxane, the potassium chloride separates out quantitatively. After filtration and evaporation of the solvent, the residue is worked up according to Example 1.

(6) 18 g. of sorbose are dissolved in 900 cc. of water, together with 30 g. of potassium oxalate and, after adding 10 g. of 10% platinized carbon or a corresponding amount of platinum-barium-sulfate, is shaken with oxygen. In the course of 80 hours, about 2.5 liters of oxygen will be taken up. The solution then contains about 50% of the theory of ketogulonic acid with 20% of unchanged sorbose. The oxalic acid is precipitated by the just sufficing quantity of baryta and the small excess of barium removed quantitatively by sulfuric acid. The batch is worked up as indicated in Example 5.

In lieu of potassium oxalate, 29 g. of crystal soda can also be added. Oxygen adsorption and yields are then similar. The excess of carbonate is decomposed by the addition of hydrochloric acid. The yields are equally favorable if instead of platinized carbon, colloidal platinum or $PtO_2$, previously reduced with hydrogen, is used.

(7) 18 gm. of sorbose are dissolved in 800 cc. of water and after addition of 15 g. of freshly prepared catalyst (carbon impregnated with palladium), is shaken with oxygen at room temperature. From time to time, 10 cc. of normal KOH is added until a total of 90 cc. have been used. The oxygen consumption amounts to about 1.8 liters in 26 hours. The batch is worked up according to the procedure given in Example 5. 25% of the theoretical yield of ketogulonic acid is obtained, together with 40% of unchanged sorbose.

(8) 180 g. of sorbose are dissolved in water, together with 150 g. of potassium oxalate and 100 g. of sodium carbonate. After adding 100 g. of 10% platinized carbon, the mixture is brought to a volume of 6 to 9 liters and shaken at room temperature with oxygen in a closed vessel. Every 10 hours or so oxygen is passed through for a short while in order to remove the carbonic acid. The quantity of oxygen taken up cannot be measured accurately because of the carbonic acid formed. In lieu of shaking with oxygen, the substance can also be stirred or shaken with air, in which case, however, care has to be taken that the platinized carbon does not settle out. After 70-80 hours, about 50% of ketogulonic acid are obtained. The solution is filtered off from the catalyst and concentrated under reduced pressure to about 1.5 to 2.0 liters. The catalyst can be reemployed for further similar oxidations without losing its activity. The water-clear solution is mixed with a concentrated solution of barium chloride until no further precipitation is formed. After several hours standing, the solution is filtered off, freed from barium by means of sulfuric acid and brought to a pH of 7-8 with a few cc. of n-NaOH. On concentrating the solution thus obtained, under reduced pressure, a mixture of potassium and sodium chloride separates at first which is filtered off. After further evaporation to a thinly liquid syrup, the sodium salt of ketogulonic acid separates out. The solution is left standing over night to complete the crystallization and then the substance is filtered off. By further concentrating the mother liquor, potassium and sodium chloride crystallize out. A second fraction of sodium-ketogulonate is formed on standing. For purification, the sodium salt thus obtained is treated with an equal quantity by weight of a mixture of methanol-water 60:40, filtered off and washed with methanol. The sodium salt of the ketogulonic acid crystallizes with 1 mol water, F=145° (under decomposition), $$[\alpha]_D^{24} = -23.4°$$

in accordance with Micheel, Kraft & Lohmann, Hoppe Seylers Zeit. Physiol. Chem. vol. 225, pp. 24-25 (1934). The yield is 40%.

(9) 18 g. of sorbose are dissolved in a phosphate or borate buffer solution having a pH value of 9, containing about 2 mols of the salt in question for each mol of sorbose. After adding 10 g. of 10% platinized carbon, the solution is shaken with oxygen until about 3 liters have been absorbed. About 30% of unchanged sorbose is recovered. Working up takes place in the same manner as described in Example 1. About 50% of the theory are obtained.

(10) 180 g. of sorbose are dissolved in 5 liters of water and mixed with a solution of 100 g. of sodium carbonate in 4 liters of water. After adding 100 g. of 10% platinized carbon, the substance is shaken in the open air. After 60-70 hours, the substance is filtered off from the catalyst, brought to a pH 8 with a few cc. of n-NaOH and concentrated under reduced pressure. The sodium salt of ketogulonic acid thus separating is filtered off, and later combined with the second fraction obtained by further concentration of the mother liquor, and purified with aqueous methanol as illustrated in Example 8. The yield is 120 g., i. e., 50% of the theory. The platinum catalyst can be used for further batches.

(11) 36 g. of sorbose are dissolved in 1.5 liters of water and mixed with 20 g. of 10% platinized carbon. A moderate stream of purified air or oxygen in fine dispersion (sieve plate, Jena glass filter plate, filter candle) is bubbled through the solution. 10 cc. of a solution of 20 g. of sodium bicarbonate in 250 cc. of water are added every 2 to 3 hours. The solution can also be added dropwise in the course of 40 hours through a dropping funnel. After such addition is completed, the oxidation is continued for another 10 hours and then stopped. The batch is worked up as in Example 10 with the same yield. The catalyst can be used for subsequent batches.

We claim as our invention:

1. The process which comprises reacting an aqueous solution of sorbose with oxygen and maintaining the hydrogen ion concentration conditions of that solution at approximate values represented by a pH of the order of about 6 to 11.

2. The process which comprises reacting an aqueous solution of sorbose with oxygen in the presence of a noble metal catalyst and maintaining the hydrogen ion concentration conditions of that solution at approximate values represented by a pH of the order of about 6 to 11.

3. The process which comprises reacting an aqueous solution of sorbose with oxygen in the presence of an oxidizing catalyst and maintaining the hydrogen ion concentration conditions of that solution at approximate values represented by a pH of the order of about 6 to 11.

4. The process which comprises reacting an aqueous solution of sorbose with oxygen in the presence of a noble metal catalyst distributed on a porous carrying agent and maintaining the hydrogen ion concentration conditions of that solution at approximate values represented by a pH of the order of about 6 to 11.

5. The process which comprises establishing and maintaining an aqueous solution of sorbose characterized by the absence of a strongly alkaline condition and reacting said solution with oxygen in the presence of an alkali metal salt of a weak acid to prevent the development of a strongly acid condition.

6. The process which comprises establishing and maintaining an aqueous solution of sorbose characterized by the absence of a strongly alkaline condition and reacting said solution with oxygen in the presence of a buffer agent capable of maintaining the hydrogen ion concentration of said solution at values represented by a pH of the order of magnitude of about 6 to 11.

7. The process which comprises establishing and maintaining an aqueous solution of sorbose characterized by the absence of a strongly alkaline condition and reacting said solution with oxygen in the presence of an alkali metal salt of a weak acid to prevent the development of a strongly acid condition, said salt being used in the proportion of about 3 mols thereof to one mol of sorbose.

8. The process which comprises establishing and maintaining an aqueous solution of sorbose characterized by the absence of a strongly alkaline condition and having a hydrogen ion concentration measured by pH values of the order of about 8 to 10 and reacting said solution with oxygen in the presence of an alkali metal salt of a weak acid to prevent the development of a strongly acid condition.

OTTO DALMER.
KURT HEYNS.